Figure 1:
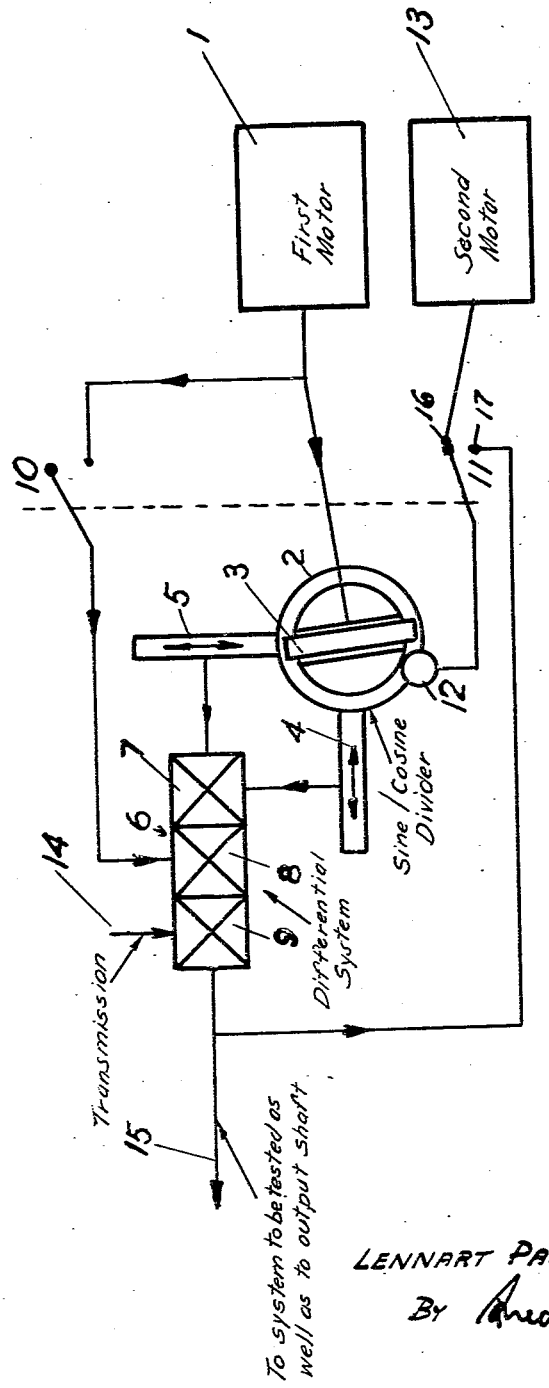

June 4, 1957   L. P. PÅLSSON   2,794,337
APPARATUS FOR TESTING TRANSMISSION SYSTEMS
Filed Oct. 1, 1953   3 Sheets-Sheet 3

INVENTOR
LENNART PAUL PÅLSSON
BY
ATTORNEY

United States Patent Office 2,794,337
Patented June 4, 1957

2,794,337
APPARATUS FOR TESTING TRANSMISSION SYSTEMS

Lennart Paul Pålsson, Bofors, Sweden, assignor to Aktiebolaget Bofors, Bofors, Sweden Application October 1, 1953, Serial No. 383,623

Claims priority, application Sweden October 4, 1952

6 Claims. (Cl. 73—1)

The present invention relates to a testing apparatus for testing the accuracy and responsiveness of transmission systems, preferably transmission systems of the servo type.

A now preferred though not exclusive field of application of the invention is a testing apparatus for testing a transmission system used for controlling the elevational and azimuth position of a gun barrel by the gun directing equipment, and the invention will be described hereinafter in connection with a testing apparatus for testing the transmission system of a gun.

Before a gun is delivered it is necessary and customary to test, among others, the transmission system of the gun as to the movements which the gun has to perform in actual use.

One of the movements the gun barrel experiences in actual use is equal to a sine wave movement of any selected frequency and amplitude. Another movement of the gun is the movement required to follow an aircraft passing overhead. For such follow-up movement, the gun barrel has to move very slowly when the aircraft is still at a great distance from the gun emplacement, then gradually to increase its velocity to a very fast movement as the aircraft reaches its shortest distance from the gun emplacement and finally gradually to slow down as the aircraft recedes.

The transmission system proper for traversing and elevating or depressing the gun barrel does not constitute part of the present invention so that it is not essential for the understanding of the invention to describe the transmission system in detail. It suffices to state that any transmission system, conventional or non-conventional, may be used that is capable of imparting to the gun barrel the afore described movements.

The principal object of the present invention is to provide a novel and improved testing apparatus which permits the control of the transmission system so that it effects the afore described gun adjustments. In other words, a testing apparatus in accordance with the invention permits the simulation of the operational gun adjustments.

Another object of the invention is to provide a novel and improved testing apparatus including drive means and control means therefor which permit selectively to effect the afore described gun movements by the agency of the transmission system associated with the gun.

According to a now preferred embodiment of the invention, the testing apparatus comprises an adjustable speed motor operatively connected with the driving unit of a sine/cosine divider means, a differential system including input and output shafts and operatively connected with the output shaft of the divider, said output shaft of the differential system constituting also the output shaft of the testing apparatus, a second adjustable motor, and a switching means which in one position connects the first motor also with the differential system and the angle displacement unit of the sine/cosine divider with the output shaft of the differential system and in a second position connects the second motor with the angle displacement unit while disconnecting the first motor from the differential system. As a result, the testing apparatus permits to set up the afore described two movements for testing the transmission system.

Other and further objects, feature and advantages of the invention will be pointed out herein after and set forth in the appended claims forming part of the application.

In the accompanying drawing a now preferred embodiment of the invention is shown by way of illustration and not by way of limitation.

Figure 2:
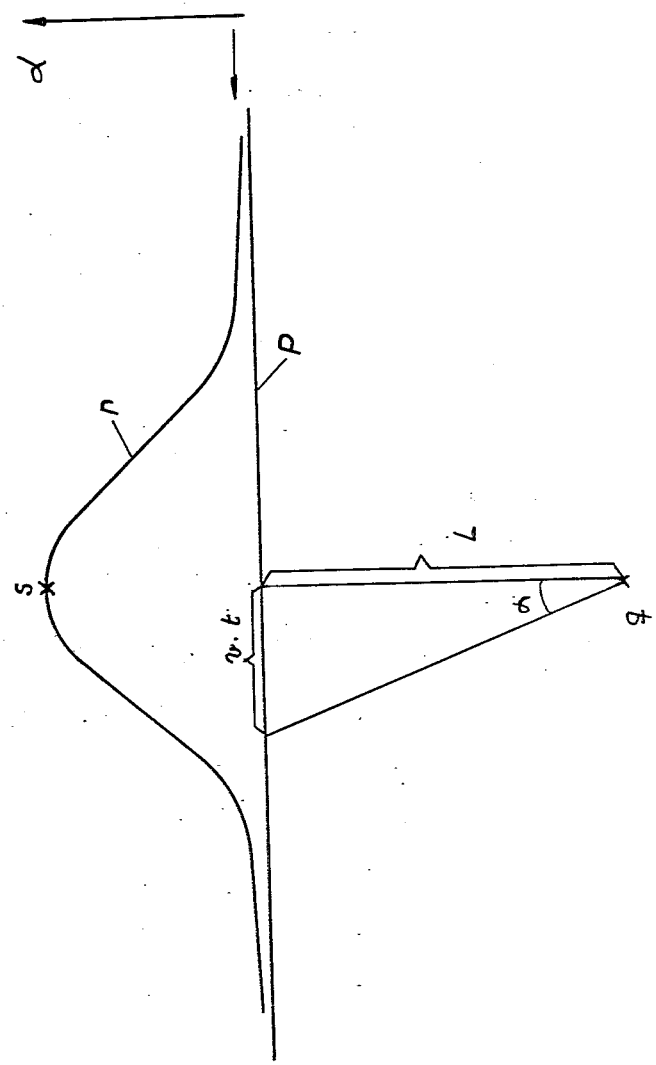
Figure 3:
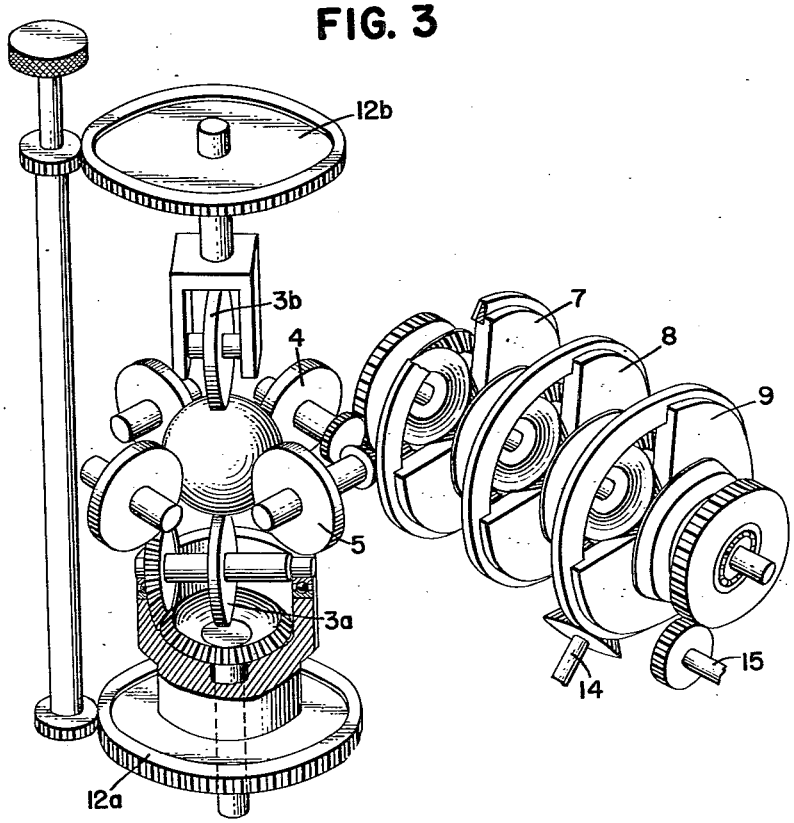

In the drawing:

Fig. 1 is a diagrammatic view of a testing apparatus according to the invention, and Fig. 2 is a graph showing the movements of the transmission system as effected by the apparatus of Fig. 1, and Fig. 3 is an isometric view of the sine/cosine divider of the apparatus.

Referring first to Fig. 1 in detail, the exemplified testing apparatus comprises an adjustable speed drive means such as an electric motor rotating the driving unit 3 of a conventional sine/cosine divider generally designated by reference 2. The motor is coupled with the divider by a suitable conventional transmission which is symbolized in the figure as are all the other transmissions of the apparatus. The divider is operatively coupled with a differential system 6 by a transmission including two gears or wheels 4 and 5 rotated by the divider. The differential system includes three differential units 7, 8 and 9 and the motion transmitted by wheels 4 and 5 is combined in differential unit 7. Instead of two transmission wheels one wheel may also be employed. The differential unit 8 is connected with motor 1 through a control member 10 of a change-over switching arrangement including the control members 10 and 11. Control member 11 includes a movable arm permanently connected with the angle displacement unit 12 of divider 2. The arm is engageable with either one of two members 16 and 17. Engagement of the arm with member 16 connects a second adjustable speed drive means 13 such as an electric motor with the angle displacement unit 12 and engagement of the arm with member 17 connects displacement unit 12 with the output shaft 15 of the differential system 6 which shaft also constitutes the output shaft of the apparatus. Output shaft 15 should be visualized as being coupled with the transmission system to be tested or more specifically with those components of the system which in case of a gun transmission system are actuated by the hand wheel controlling the training of the gun. As will be more fully explained hereinafter, the afore described apparatus is capable of causing all the movements of the transmission system which a gun layer would have to perform.

The differential unit 9 of the differential system is provided with a transmission 14 which serves to impart to the system, either manually or by an additional motor (not shown), a movement superimposed to the movement provided by motor 1 or independent therefrom.

Fig. 3 illustrates a physical embodiment of the system according to the invention diagrammatically shown in Fig. 1. The same reference numerals are used to designate corresponding parts, except that numerals 3a and 3b in conjunction correspond to numeral 3 of Fig. 1 and that numerals 12a and 12b in conjunction correspond to numeral 12 of Fig. 1. The relation between Figs. 1 and 3 is evident. The structural details of the sine/cosine divider and of the differential system 6 are all conventional and no claim is made to said structural details.

The operation of a testing apparatus as herein before described, is as follows:

Let it be assumed that the change-over switching arrangment is in position shown in Fig. 1 in full lines in which the connection between motor 1 and differential unit 8 is interrupted and a connection is established between motor 13 and angle displacement unit 12. As a result, output shaft 15 performs an oscillatory movement the amplitude of which is determined by the velocity of motor 1 and the frequency of which is controlled by the velocity of motor 13. When it is now desired to cause the testing apparatus to simulate the movement performed by a gunner or layer when training the gun at an aircraft in flight the switching arrangement is placed in its second position in which a connection is established between motor 1 and differential unit 8 and between displacement unit 12 and output shaft 15.

The functions performed by the testing apparatus will become more readily apparent from an analysis of the graph of Fig. 2. In this graph the abscissa $p$ represents the orbit in which an aircraft travels at the constant speed $v$ and the ordinate represents the angular speed $\dot{\alpha}$. The graph further shows the position of a gun $q$ placed at a right angular distance $L$ from the orbit $p$. The angular speed $\dot{\alpha}$ which must be imparted to the gun in order to enable the same to follow the moving aircraft may be expressed by the following equation:

$$\dot{\alpha} = \frac{v}{L}(1 + \cos 2\alpha)$$

This equation is derived from the expression obtained for the tangent of the triangle shown, to wit:

$$tg\alpha = \frac{v \cdot t}{L}$$

By feeding back the angle of turning of the shaft 15 relative to angle displacement unit 12 and by selecting the ratio of transmission between this unit and the sine/cosine divider so that the divider turns double the supplied angle of turning, a speed can be given to shaft 15 corresponding to the speed $\dot{\alpha}$ of the equation. The configuration of the curve $r$ of Fig. 2 represents the speed of shaft 15 relative to the orbit $p$ and thus indirectly to the angle $\alpha$.

When the testing apparatus is first started shaft 15 may hence be operated at a speed controlled by the prevailing position of the driving unit 3. Let it be assumed that the position of the driving unit is such that a starting speed is obtained corresponding to point $s$ on curve $r$. Then the rate of speed to the left of point $s$ only is obtainable. When it is now desired to displace the position of point $s$, an additional movement is superimposed to the differential system by actuating transmission 14. The expression $$\frac{v}{L}$$

in the previously given equation for $\dot{\alpha}$ corresponds to a rotational speed $n$ of motor 1.

For purpose of accurate testing it is necessary that the curve $r$ can be repeated. To obtain such repetition of the curve, the numeral 1 in the equation for speed $\dot{\alpha}$ is replaced by a numeral greater than 1. This may be accomplished by deliberately setting a faulty ratio of transmission.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

I claim:

1. A testing apparatus for testing a transmission system capable of transmitting different movements of the type described comprising in combination, first adjustable speed drive means, sine/cosine divider means including a driving unit, an angle displacement unit and output transmission means, transmission means connecting said first drive means with said driving unit, a differential system including input and output shaft means, the output shaft means of the differential system also constituting the output shaft means of the apparatus connectable to the transmission system to be tested, transmission means operatively connecting the input shaft means of the differential system with the output transmission means of said divider means, a second adjustable speed drive means, and change-over switching means movable into either one of two positions, one of said positions additionally connecting the first drive means with the differential system and said angle displacement unit with the output shaft means of the apparatus, the other position connecting the second drive means with said angle displacement unit while disconnecting the first drive means from the differential system.

2. A testing apparatus according to claim 1, wherein the differential system and the sine/cosine divider are dimensioned such that at said first position the output shaft means of the apparatus perform a movement proportional to the function $n.(a + \cos 2\alpha)$ wherein $n$ is the speed of the first drive means; $a$ is a constant equal to, greater or smaller than 1; and $\alpha$ is the angle of the output shaft means of the apparatus.

3. A testing apparatus according to claim 1, wherein the said differential system comprises several differential units coacting with each other, one end unit being connected with the output transmission means of the divider means through the respective transmission means and the other end unit being connected with the output shaft means of the apparatus.

4. A testing apparatus according to claim 2, wherein the said first drive means is connectable by the change-over switching means with an intermediate unit of the differential system.

5. A testing apparatus according to claim 4, wherein the said end unit connected with the output shaft means of the apparatus coacts with a transmission means for imparting a movement to the differential system superimposed to the movement imparted to the system by the first drive means and the divider means respectively.

6. A testing apparatus according to claim 1, wherein the said differential system is provided with a transmission means for imparting a movement to the differential system superimposed to the movement imparted to the system by the first drive means and the divider means respectively.

References Cited in the file of this patent

UNITED STATES PATENTS

| | | |
|---|---|---|
| 1,398,828 | Von Appen | Nov. 29, 1921 |
| 2,405,065 | Tear | July 30, 1946 |
| 2,490,574 | Austin | Dec. 6, 1949 |
| 2,497,069 | Carpenter et al. | Feb. 14, 1950 |
| 2,577,650 | Davis | Dec. 4, 1951 |
| 2,578,666 | Borden | Dec. 18, 1951 |

FOREIGN PATENTS

| | | |
|---|---|---|
| 904,762 | France | Mar. 19, 1945 |